(12) United States Patent
Gupta et al.

(10) Patent No.: US 12,095,768 B2
(45) Date of Patent: Sep. 17, 2024

(54) EDGE DISCOVERY AUTHORIZATION FOR A USER DEVICE

(71) Applicant: Verizon Patent and Licensing Inc., Basking Ridge, NJ (US)

(72) Inventors: Umesh Kumar Gupta, Morris Plains, NJ (US); Bjorn Hjelm, Livermore, CA (US); Jyotsna Kachroo, Millburn, NJ (US); Raghuram Parvataneni, Plano, TX (US); Ramanathan Subramaniam, Old Bridge, NJ (US); Ning Zhang, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 367 days.

(21) Appl. No.: 17/709,160

(22) Filed: Mar. 30, 2022

(65) Prior Publication Data
US 2023/0319041 A1   Oct. 5, 2023

(51) Int. Cl.
*H04L 9/40* (2022.01)
*H04L 67/10* (2022.01)
*H04L 67/141* (2022.01)

(52) U.S. Cl.
CPC .............. *H04L 63/10* (2013.01); *H04L 63/08* (2013.01); *H04L 67/10* (2013.01); *H04L 67/141* (2013.01)

(58) Field of Classification Search
CPC ......... H04L 63/10; H04L 63/08; H04L 67/10; H04L 67/141
See application file for complete search history.

(56) References Cited

U.S. PATENT DOCUMENTS

| | | | |
|---|---|---|---|
| 2021/0028992 A1* | 1/2021 | Chang | H04L 67/51 |
| 2021/0176234 A1* | 6/2021 | Silverstein | H04L 63/083 |
| 2021/0314156 A1* | 10/2021 | Liu | H04N 21/2225 |
| 2023/0047503 A1* | 2/2023 | Kim | H04W 48/16 |
| 2023/0070253 A1* | 3/2023 | Rajadurai | H04W 12/06 |

* cited by examiner

*Primary Examiner* — Chau Le

(57) ABSTRACT

An application client on a user device receives an internal request from within the application client. The internal request is associated with edge application device(s) hosted by a computing platform. In response to the internal request, the application client obtains an authorization token from the computing platform and initiates an edge discovery request to the computing platform using the authorization token. In response to the edge discovery request, the application client receives connection information of a particular edge application device among the edge application device(s) that is identified for the application client by the computing platform. The application client establishes a connection between the application client and the particular edge application device using the connection information of the particular edge application device.

20 Claims, 7 Drawing Sheets

EDGE DISCOVERY AUTHORIZATION FOR A USER DEVICE

BACKGROUND INFORMATION

In a system that implements edge computing, computing resources and other system resources may be provided by one or more edge nodes. The edge nodes may be located at the edges of the system infrastructure and therefore may be located closer to client devices (e.g., mobile phones, personal computers, automated vehicles, etc.) than a central data center of the system. Accordingly, data generated by the client devices may be processed by the edge nodes instead of being transmitted to the central data center for processing. Due to the close proximity between the client devices at which the data is generated and the edge nodes at which the data is processed, the system can provide low latency in processing requests for applications, especially for time-sensitive applications such as video conferencing applications, vehicle control applications, etc.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Methods and systems for edge discovery authorization for a user device are described herein. In some embodiments, edge discovery operations may be performed in a context of a computing system that provides edge computing. For example, the computing system may implement one or more server instances of an application on one or more multi-access edge computing (MEC) devices. As described herein, a MEC device (e.g., a MEC server) on which a server instance of the application resides may be implemented by or on one or more edge computing devices that are geographically located proximate to user devices on which application clients of the application operate. When an application client of the application on a user device needs to communicate with a server instance of the application, an edge discovery operation may be performed to identify a particular server instance of the application for the application client to communicate with. For example, the particular service instance may be identified among the one or more server instances of the application such that a distance between the user device that implements the application client and one or more edge computing devices that implement the MEC device including the particular server instance is minimized. In some embodiments, the application client may need to obtain an authorization to request that the edge discovery operation be performed. The process to obtain such an authorization may be referred to as edge discovery authorization.

Figure 1:
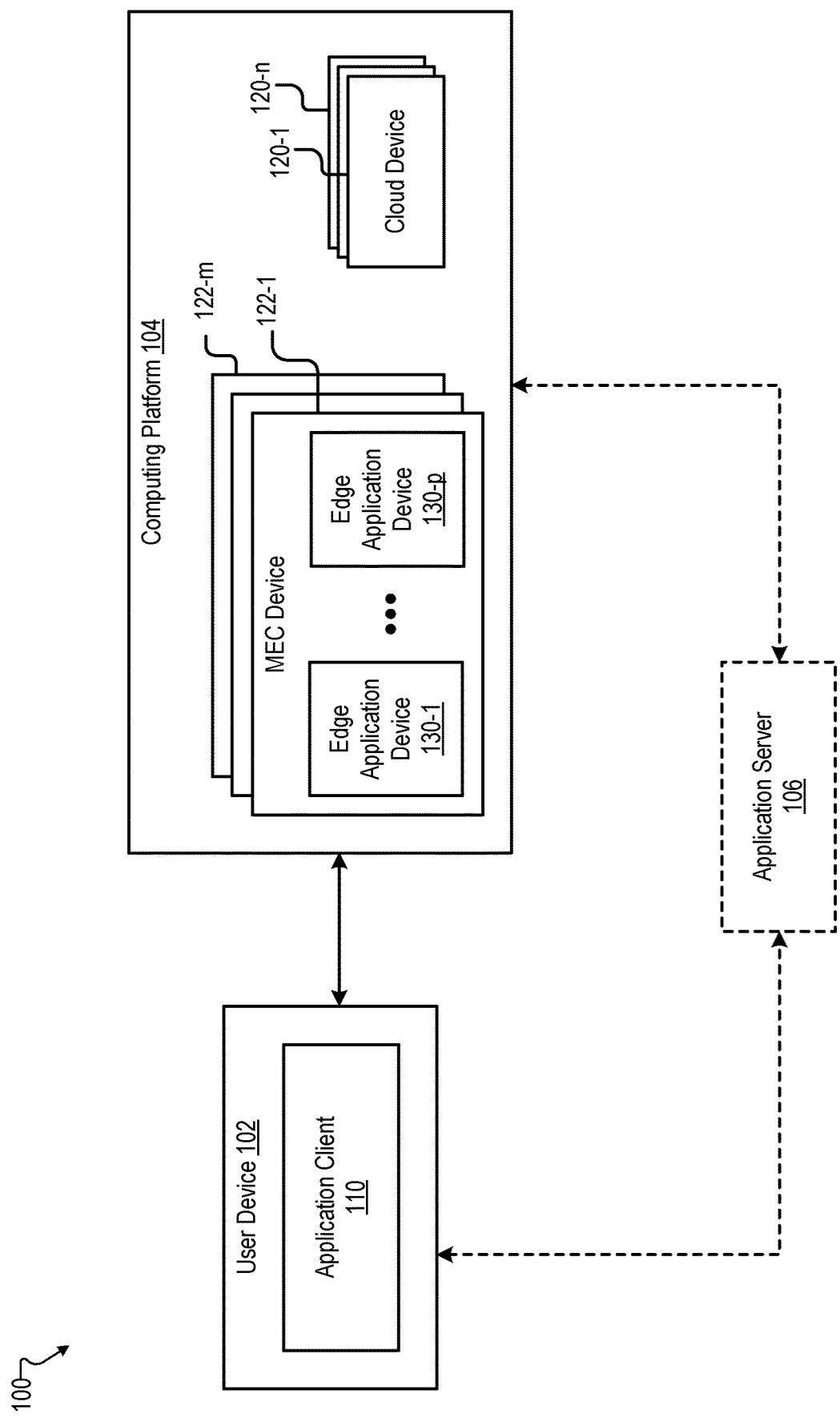
FIGS. 1 and 2 show illustrative computing systems according to embodiments described herein.

FIG. 1 shows an illustrative computing system 100 that implements edge computing. As depicted in FIG. 1, computing system 100 may include a user device 102, a computing platform 104, and an application server 106 that are communicatively coupled to one another. In some embodiments, application server 106 may be optional as indicated by dashed lines in FIG. 1. While FIG. 1 illustrates one user device 102 to simplify the description, it should be understood that computing system 100 may include one or more user devices 102.

User device 102 may be a computing device (e.g., a personal computer, a mobile phone, an automated vehicle, an internet of things (IoT) device, etc.) within computing system 100 and may or may not be associated with a user. In some embodiments, user device 102 may include an application client 110 associated with an application and operated on user device 102 (e.g., by a user of user device 102) to use functionalities and/or services provided by the application. Non-limiting examples of the application include, but are not limited to, a social network application, a content streaming application, a video conferencing application, a vehicle control application, etc.

Computing platform 104 may be any suitable computing environment that provides and/or manages various resources (e.g., computing resources, network resources, storage resources, etc.) being used by one or more application providers to provide one or more corresponding applications to users.

In some embodiments, computing platform 104 may include various computing components (e.g., hardware servers, virtual servers, etc.) operating on a network. The network associated with computing platform 104 may be a wired or wireless communications network (e.g., a cellular network used for mobile phone and data communications, a 5G network or network of another suitable technology generation, a cable or satellite carrier network, a mobile telephone network, etc.) and may be operated and/or managed by a provider entity such as a mobile network operator (e.g., a wireless service provider, a wireless carrier, a cellular company, etc.). The provider entity may own or control not only the network but also own or control other components of computing platform 104. In some embodiments, the network may be integrated with other network infrastructure that is outside of the control of the provider entity. For example, such external network infrastructure may include the Internet, one or more wide area networks or local area networks to which one or more user devices 102 are connected, a content delivery network, and/or any other suitable network or networks managed by any third parties outside of the control of the provider entity. All elements associated with the network and the external network infrastructure may implement or employ any suitable communication technologies, devices, media, protocols, or the like as may serve a particular implementation.

In some embodiments, computing platform 104 may include one or more cloud devices 120-1 . . . 120-n (commonly referred to herein as cloud devices 120) and one or more MEC devices 122-1 . . . 122-m (commonly referred to herein as MEC devices 122) as depicted in FIG. 1.

Cloud device 120 may be a computing system such as a cloud server (e.g., a hardware server and/or a virtual server) that includes a processor, a memory, and network communication capabilities (e.g., a communication unit). In some embodiments, cloud device 120 may be implemented with one or more physical computing devices of computing platform 104. For example, cloud device 120 may be a hardware server implemented by one or more physical computing devices of computing platform 104 and/or a virtual server implemented on one or more physical computing devices of computing platform 104. The physical computing devices that implement cloud device 120 may be located remotely from the edge of the network associate with computing platform 104 and therefore may be geographically located at a relatively long distance from user devices 102. As an example, cloud device 120 may be a hardware server being formed by one or more physical computing devices located within a remote data center. As another example, cloud device 120 may be a virtual server residing on one or more physical computing devices located within a remote data center and the one or more physical computing devices may contribute various resources (e.g., computing resources, storage resources, etc.) to establish cloud device 120.

MEC device 122 may be a computing system such as a MEC server (e.g., a hardware server and/or a virtual server) that includes a processor, a memory, and network communication capabilities (e.g., a communication unit). In some embodiments, MEC device 122 may be implemented with one or more physical computing devices of computing platform 104. For example, MEC device 122 may be a hardware server implemented by one or more physical computing devices of computing platform 104 and/or a virtual server implemented on one or more physical computing devices of computing platform 104. The physical computing devices that implement MEC device 122 may be located at the edge of the network associated with computing platform 104 and therefore may be referred to as edge computing devices. In some embodiments, an edge computing device may be geographically located proximate to one or more user devices 102 (geographically more proximate than the cloud devices 120 to a user device 102). For example, the edge computing device may be positioned within a limited distance from a reference point (e.g., a center point) of a coverage area and may be configured to communicate with user devices 102 located within the coverage area.

In some embodiments, one or more edge computing devices of computing platform 104 may implement MEC device 122 in the form of a hardware server or a virtual server. As an example, MEC device 122 may be a hardware server deployed on a base station, a cell aggregation site, and/or other edge computing devices located at the edge of the network associate with computing platform 104. As another example, MEC device 122 may be a virtual server residing on one or more base stations, cell aggregation sites, and/or other edge computing devices located at the edge of the network associated with computing platform 104 and these edge computing devices may contribute various resources (e.g., computing resources, storage resources, etc.) to establish MEC device 122.

In some embodiments, MEC device 122 may implement one or more edge application devices 130-1 . . . 130-$p$ (commonly referred to herein as edge application devices 130) of one or more applications. An edge application device 130 of an application (e.g., a social network application) may be a computing system such as an edge application server (e.g., a server instance) associated with the application that is implemented on MEC device 122 and configured to communicate with one or more application clients 110 of the application on one or more user devices 102. For example, edge application device 130 may process and respond to various requests received from application clients 110 to provide functionalities and/or services of the application to users of user devices 102. In some embodiments, edge application devices 130 hosted on MEC device 122 may be associated with the same application and/or associated with different applications.

Application server 106 may be a hardware server and/or a virtual server that includes a processor, a memory, and network communication capabilities (e.g., a communication unit). In some embodiments, application server 106 may be associated with an application (e.g., a social network application) and may be configured to communicate with one or more application clients 110 of the application on one or more user devices 102. For example, application server 106 may process and respond to various requests received from application clients 110, communicate with other systems such as computing platform 104 on behalf of application clients 110, etc. In some embodiments, application server 106 may be operated and/or managed by an application provider of the application and may be implemented within computing platform 104 and/or on a different system separate from computing platform 104.

In some embodiments, one or more edge application devices 130 of an application (e.g., a social network application) may be registered with computing platform 104 and may be implemented on one or more MEC devices 122 within computing platform 104 as described herein. Accordingly, when application client 110 of the application on a user device 102 needs to communicate with an edge application device 130 (e.g., an edge application server) of the application, a managing system of computing platform 104 may identify a particular edge application device 130 among one or more edge application devices 130 of the application for application client 110 to communicate with. However, in some computing systems, application client 110 may not be authorized to communicate and/or interact with the managing system of computing platform 104, and therefore application client 110 may not be able to request the managing system to identify a particular edge application device 130 for application client 110 when needed. In this case, to obtain information about a particular edge application device 130 with which application client 110 may communicate, application client 110 may request application server 106 to interact with the managing system on behalf of application client 110. As described herein, application server 106 may be the application server operated and/or managed by the application provider of the application. The application server 106 may be authorized to initiate various requests to the managing system of computing platform 104. The authorization of application server 106 to communicate with the managing system of computing platform 104 may be established in any suitable way, including based on a business-to-business relationship between an operator of computing platform 104 and an operator of application server 106.

With this authorization established, application server 106 may initiate an edge discovery request to the managing system of computing platform 104 requesting the managing system to identify a particular edge application device 130 with which application client 110 may communicate. In response to the edge discovery request, the managing system may identify a particular edge application device 130 for application client 110 among one or more edge application devices 130 of the application based on one or more criteria (e.g., processing capabilities of edge application devices 130, etc.). The managing system may then transmit connection information (e.g., an IP address, a port number, etc.) of the particular edge application device 130 to application server 106, and application server 106 may provide the connection information of the particular edge application device 130 to application client 110 on user device 102.

In such implementations, application client 110 on user device 102 may not be able to obtain connection information of a particular edge application device 130 directly from the managing system of computing platform 104. Instead, application server 106 may participate in obtaining the connection information of a particular edge application device 130 for application client 110. As described above, application server 106 may initiate the edge discovery request to the managing system on behalf of application client 110, and then forward the connection information of a particular edge application device 130 received from the managing system to application client 110. Thus, the connection information of a particular edge application device 130 may be provided to application client 110 inefficiently through application server 106. In addition, this implementation may result in resources of application server 106 being inefficiently consumed due to the participation of application server 106 in obtaining connection information of a particular edge application device 130 for various application clients 110 on multiple user devices 102.

In other implementations, application server 106 may not participate in obtaining connection information of a particular edge application device 130 for application client 110. Instead, application server 106 may participate in obtaining an authorization (e.g., an authorization token) for application client 110 to request such connection information from the managing system of computing platform 104. For example, application server 106 may initiate a token request to the managing system on behalf of application client 110, and then receive and forward an authorization token received from the managing system to application client 110. Application client 110 may use the authorization token to initiate an edge discovery request to the managing system. In response to the edge discovery request from application client 110, the managing system may identify a particular edge application device 130 for application client 110 among one or more edge application devices 130 of the application based on one or more criteria (e.g., processing capabilities of edge application devices 130, etc.), and transmit connection information (e.g., an IP address, a port number, etc.) of the particular edge application device 130 to application client 110.

Thus, in such implementations, while application client 110 may be able to receive the connection information of a particular edge application device 130 directly from the managing system of computing platform 104, the authorization token being used in this process may still be provided to application client 110 through application server 106. In addition, to maintain the validity of the authorization token (e.g., renewing the authorization token), application server 106 may communicate with the managing system on behalf of application client 110. Such implementations that use application server 106 to obtain and renew an authorization token on behalf of application client 110 maybe inefficient and cumbersome in some aspects.

In some implementations, systems and methods may be configured to perform edge discovery authorization for application client 110 in any of the ways described herein so that application client 110 may be authorized to request an edge discovery operation to be performed. For example, one or more components of user device 102 and one or more components of computing platform 104 may be configured to perform edge discovery authorization operations as described herein to obtain authorization for application client 110 to request edge discovery operations from one or more components of computing platform 104. Such edge discovery authorization operations may allow user device 102 to obtain edge discovery authorization directly from computing platform 104 without having to use or rely on application server 106 to obtain authorization on behalf of application client 110. Computing system 100 may be configured to perform any of the edge discovery authorization operations described herein, including operations in accordance with one or more of the example implementations described herein.

Figure 2:
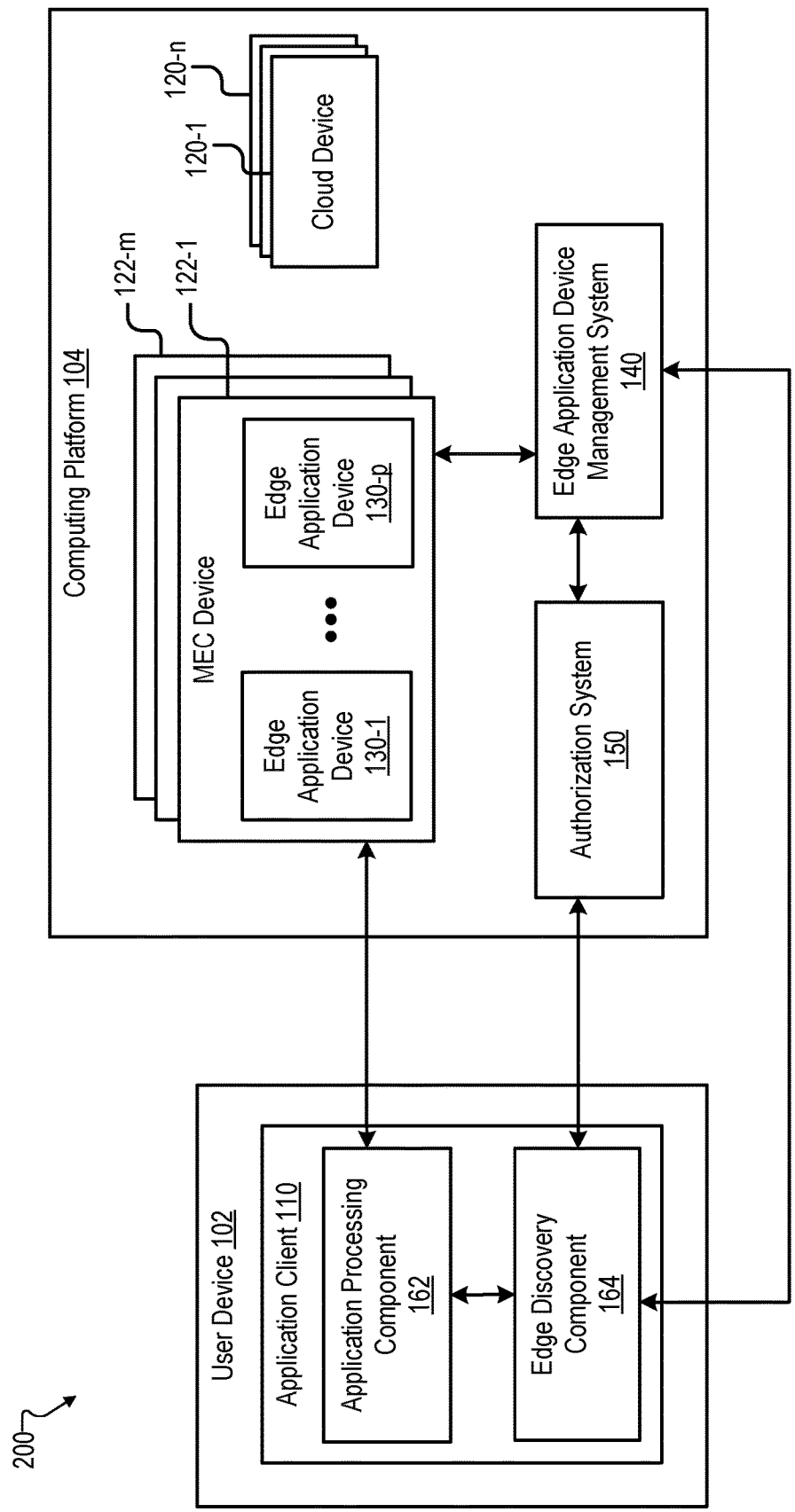

FIG. 2 shows an illustrative computing system 200 that implements edge computing and is configured to perform edge discovery authorization for application client 110. As depicted in FIG. 2, computing system 200 may include user device 102 communicatively coupled to computing platform 104. Computing platform 104 may include an edge application device management system 140 and an authorization system 150 as depicted in FIG. 2.

Edge application device management system 140 may include or may be implemented by one or more computing devices configured to manage edge application devices 130 of various applications (e.g., a social network application, a content streaming application, a vehicle control application, etc.) that reside on one or more MEC devices 122 of computing platform 104. For example, edge application device management system 140 may be configured to manage the registration and the deployment of edge application devices 130 for various applications on computing platform 104.

To deploy one or more edge application devices 130 for an application (e.g., a social network application) on computing platform 104, an application administrator may create an application profile for the application using a corresponding interface (e.g., an application programming interface (API) request, a graphical user interface, etc.) of edge application device management system 140. In some embodiments, the application profile of the application may specify various server attributes of a server instance associated with the application. For example, the application profile may specify computing resources (e.g., a processor clock speed, a memory clock speed, a memory capacity, etc.), network resources (e.g., a network bandwidth, a request rate threshold, a latency threshold, an availability threshold, etc.), storage resources (e.g., a storage capacity, etc.), and/or other resources to be configured and/or allocated for a server instance of the application.

In some embodiments, when the application profile of the application is created, the application administrator may register one or more edge application devices 130 for the application using the application profile of the application. For example, the application administrator may initiate an API request to edge application device management system 140 requesting that the application profile of the application be associated with one or more edge application devices 130. Each edge application device 130 may have the server attributes specified in the application profile and may operate as a server instance of the application to process and respond to requests received from application clients 110 of the application. In some embodiments, each edge application device 130 may be assigned connection information (e.g., an Internet Protocol (IP) address, a port number, etc.) and the connection information may be used by application clients 110 to communicate with edge application device 130. In some embodiments, the application administrator may also specify one or more coverage areas associated with one or more edge application devices 130 such that the edge application devices 130 may handle requests from application clients 110 that operate on user devices 102 geographically located within the coverage areas. In some embodiments, as one or more edge application devices 130 are server instances that receive and process requests associated with the application, each edge application device 130 may be considered an application endpoint of the application and one or more edge application devices 130 may be associated with the same application endpoint identifier (ID).

In some embodiments, once one or more edge application devices 130 of the application are registered, edge application device management system 140 may deploy and manage one or more edge application devices 130 of the application in computing platform 104. For example, edge application device management system 140 may identify one or more MEC devices 122 implemented by or on edge computing devices that are geographically located proximate to the coverage areas associated with one or more edge application devices 130, and deploy one or more edge application devices 130 on one or more MEC devices 122.

In some embodiments, the implementation of MEC devices 122 on edge computing devices may be dynamic. For example, a MEC device 122 may be a virtual server and the edge computing devices that contribute resources to establish MEC device 122 may dynamically change due to various factors (e.g., load balancing, device failure, etc.). In some embodiments, edge application device management system 140 may monitor the implementation of MEC devices 122 on the edge computing devices of computing platform 104 and adjust the deployment of one or more edge application devices 130 on MEC devices 122 accordingly. For example, edge application device management system 140 may determine that a MEC device 122 on which an edge application device 130 of the application is hosted no longer resides on edge computing devices that are located proximate to a coverage area associated with edge application device 130. In response to this determination, edge application device management system 140 may identify a different MEC device 122 implemented by or on edge computing devices that are located proximate to the coverage area associated with edge application device 130, and migrate edge application device 130 from MEC device 122 to the different MEC device 122. Accordingly, edge application device 130 may remain geographically proximate to user devices 102 located within its coverage area.

In some embodiments, as edge application device management system 140 may monitor the deployment of edge application devices 130 on MEC devices 122 and also monitor the implementation of MEC devices 122 on the edge computing devices of computing platform 104, edge application device management system 140 may be aware of a MEC device 122 on which an edge application device 130 of the application is hosted and also be aware of edge computing devices that implement MEC device 122. The edge computing devices that implement MEC device 122 on which edge application device 130 is hosted may be referred to as edge computing devices associated with edge application device 130.

In some embodiments, when application client 110 of the application on a user device 102 needs to communicate with an edge application device 130 of the application, edge application device management system 140 may perform an edge discovery operation to identify a particular edge application device 130 among one or more edge application devices 130 of the application for application client 110 to communicate with. In some embodiments, to request edge application device management system 140 to perform an edge discovery operation, application client 110 may need to obtain authorization (e.g., an authorization token) from computing platform 104 and use such authorization to request the edge discovery operation to be performed.

In some embodiments, authorization system 150 in computing platform 104 may include or may be implemented by one or more computing devices configured to perform authorization and/or authentication related to one or more components of computing platform 104. For example, authorization system 150 may be configured to grant and manage authorization such as an authorization token for application client 110. Application client 110 may use the authorization granted by authorization system 150 to access and/or communicate with edge application device management system 140. For example, application client 110 may use the authorization token (e.g., OAuth 2.0 access token) granted by authorization system 150 to request edge application device management system 140 to perform an edge discovery operation for application client 110.

As depicted in FIG. 2, application client 110 of an application may be implemented on user device 102 and may include an application processing component 162 and an edge discovery component 164 communicatively coupled to one another. In some embodiments, application processing component 162 may be a computing component associated with the application and may be configured to perform various operations associated with the functionalities and/or services provided by the application. On the other hand, edge discovery component 164 may be a computing component associated with computing platform 104 that is integrated into application client 110 of the application. Edge discovery component 164 may be provided by computing platform 104 and may be configured to cooperate with one or more components (e.g., edge application device management system 140, authorization system 150, etc.) of computing platform 104 to perform one or more functionalities (e.g., edge discovery, edge discovery authorization, etc.) provided by computing platform 104 for application client 110. In some embodiments, computing platform 104 may provide different versions of edge discovery component 164 corresponding to different device types (e.g., user devices 102 that use different operating systems). Accordingly, a version of edge discovery component 164 corresponding to a device type of user device 102 may be compatibly integrated into application client 110 running on user device 102.

In some embodiments, instead of being implemented as part of application client 110 as described above, edge discovery component 164 may be implemented and/or incorporated in user device 102 and configured to communicate with application processing component 162 of application client 110 on user device 102. Accordingly, edge discovery component 164 may be implemented within application client 110 as a component of application client 110 or outside of application client 110 as a component of user device 102 that operates within an operating system (OS) environment of user device 102.

In some embodiments, edge discovery component 164 may be configured to collaborate with authorization system 150 of computing platform 104 to perform edge discovery authorization for application client 110. When performing edge discovery authorization for application client 110, edge discovery component 164 may interact with authorization system 150 to obtain authorization (e.g., an authorization token) for application client 110 and such authorization may then be used to request an edge discovery operation to be performed for application client 110 as described herein.

For example, when application client 110 needs to communicate with an edge application device 130 of the application, application processing component 162 may initiate an internal request to edge discovery component 164. In response to the internal request, edge discovery component 164 may communicate with authorization system 150 to perform an authorization process with computing platform 104. The authorization process may verify that application client 110 is authentic and that user device 102 is authorized and up to date. The authorization process may also verify that application client 110 and user device 102 are not compromised.

In some embodiments, if the authorization process is successfully performed, authorization system 150 may generate an authorization token for application client 110 and transmit the authorization token to edge discovery component 164. Edge discovery component 164 may then use the authorization token to initiate an edge discovery request to edge application device management system 140. In response to the edge discovery request, edge application device management system 140 may perform an edge discovery operation for application client 110 to identify a particular edge application device 130 with which application client 110 may communicate among one or more edge application devices 130 associated with the application. For example, edge application device management system 140 may identify a particular edge application device 130 that has a shortest distance between user device 102 and the particular edge application device 130. The distance between user device 102 and the particular edge application device 130 may be a total distance between a geographical location of user device 102 and a geographical location of each edge computing device associated with the particular edge application device 130. Due to this shortest distance, the particular edge application device 130 may process requests for application client 110 on user device 102 with relatively low latency, thereby improving operation of user device 102 and/or user experience of the user associated with user device 102. In some embodiments, edge application device management system 140 may transmit connection information (e.g., an IP address, a port number, etc.) of the particular edge application device 130 to edge discovery component 164.

In some embodiments, edge discovery component 164 may provide the connection information of the particular edge application device 130 to application processing component 162. Application processing component 162 may establish a connection between application client 110 and the particular edge application device 130 using the connection information. Alternatively, edge discovery component 164 may itself establish the connection between application client 110 and the particular edge application device 130 using the connection information. Once the connection between application client 110 and the particular edge application device 130 is established, application client 110 may communicate with the particular edge application device 130 via the connection. For example, application processing component 162 of application client 110 may transmit a request associated with a functionality of the application to the particular edge application device 130 via the connection and receive a response to the request from the particular edge application device 130 via the connection.

Systems and methods described herein may be advantageous in a number of technical respects. For example, as described herein, edge discovery component 164 associated with computing platform 104 may be integrated into application client 110 of the application on user device 102 and may collaborate with authorization system 150 to obtain an authorization token for application client 110. Edge discovery component 164 may then use the authorization token granted by authorization system 150 to request edge application device management system 140 to perform an edge discovery operation for application client 110. Thus, due to the integration of edge discovery component 164 associated with computing platform 104 into application client 110, application client 110 on user device 102 may interact directly with authorization system 150 to perform the edge discovery authorization for application client 110, thereby obtaining the authorization token to request the edge discovery operation for application client 110. Application client 110 may also interact directly with edge application device management system 140 using the authorization token to perform the edge discovery operation for application client 110, thereby obtaining the connection information of a particular edge application device 130 with which application client 110 may communicate. As application client 110 may interact directly with authorization system 150 and edge application device management system 140 without application server 106 being involved, the edge discovery authorization and the edge discovery may be efficiently performed for application client 110 in a simplified manner, and therefore the performance of application client 110 on user device 102 and/or the user experience of the user associated with user device 102 may be improved.

Various illustrative embodiments will now be described in detail with reference to FIGS. 3-5B. It will be understood that the illustrative embodiments described below are provided as examples and that other examples not explicitly described herein may also be captured by the scope of the claims set forth below. Systems and methods described herein may provide any of the benefits mentioned above, as well as various additional and/or alternative benefits that will be described and/or made apparent below.

Figure 3:
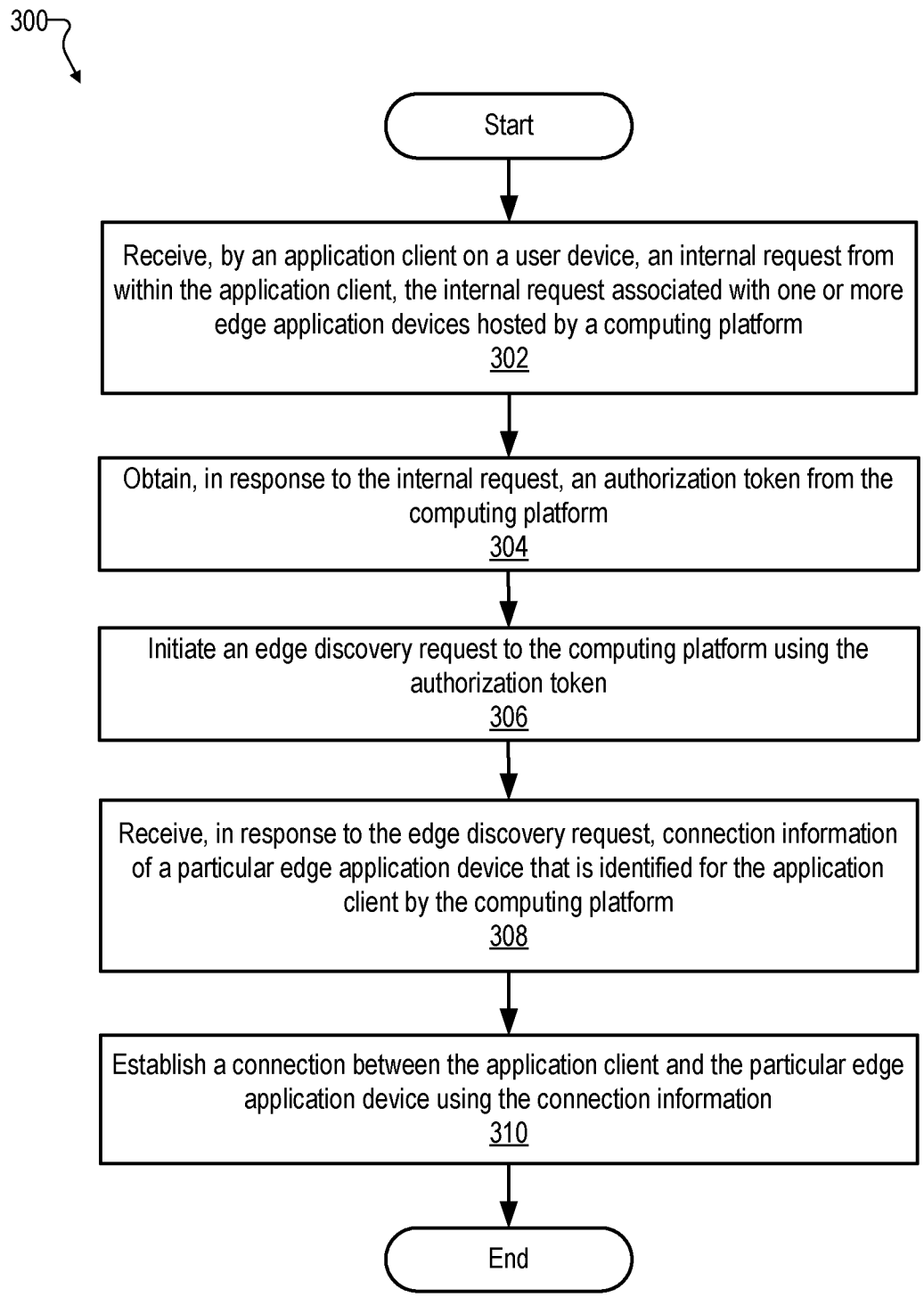
FIG. 3 shows an illustrative method for an application client on a user device according to embodiments described herein.

FIG. 3 shows an illustrative method 300 for performing edge discovery authorization. Method 300 may be performed from a perspective of application client 110 on user device 102. For example, method 300 may be performed by one or more components of application client 110 (e.g., application processing component 162, edge discovery component 164, etc.) and/or by any implementation thereof. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described.

At operation 302, application client 110 of an application (e.g., a social network application) may receive an internal request from within application client 110. In some embodiments, the internal request may be initiated by application processing component 162 of application client 110 when application client 110 needs to communicate with an edge application device 130 of the application. For example, application client 110 may need to request a server instance of the application to perform a functionality of the application, and therefore application client 110 may need an edge discovery operation to be performed to identify a particular edge application device 130 of the application with which application client 110 may communicate. Accordingly, application processing component 162 of application client 110 may initiate the internal request to edge discovery component 164 integrated into application client 110. The internal request may trigger the edge discovery authorization to be performed for application client 110 so that application client 110 may be authorized to initiate an edge discovery request to computing platform 104. In some embodiments, the internal request may be associated with one or more edge application devices 130 of the application hosted by computing platform 104. For example, the internal request may specify the application endpoint ID associated with one or more edge application devices 130 of the application. Additionally or alternatively, the internal request may specify an application ID of the application and the application ID may be used to identify one or more edge application devices 130 of the application.

At operation 304, in response to the internal request, application client 110 may obtain an authorization token from computing platform 104. For example, upon receiving the internal request from application processing component 162 of application client 110, edge discovery component 164 of application client 110 may interact with authorization system 150 of computing platform 104 to perform an authorization process with computing platform 104. To perform the authorization process, edge discovery component 164 may communicate with authorization system 150 to perform one or more device authorization operations to verify that user device 102 is authorized and up to date. Edge discovery component 164 may also communicate with authorization system 150 to perform one or more application authorization operations to verify that application client 110 implemented on user device 102 is authentic and that both application client 110 and user device 102 are not compromised.

In some embodiments, if authorization system 150 verifies that user device 102 is authorized and up to date, that application client 110 is authentic, and that both application client 110 and user device 102 are not compromised based on the device authorization operations and the application authorization operations, the authorization process may be considered successfully performed and authorization system 150 may generate an authorization token for application client 110. In some embodiments, the authorization token may be a cryptographically secured object (e.g., a string object) that can be used as a security credential when application client 110 initiates a request such as an edge discovery request to edge application device management system 140. In some embodiments, authorization system 150 may transmit the authorization token to edge discovery component 164. Thus, edge discovery component 164 may receive the authorization token generated based on the authorization process from authorization system 150 of computing platform 104.

At operation 306, application client 110 may initiate an edge discovery request to computing platform 104 using the authorization token. For example, edge discovery component 164 of application client 110 may initiate an edge discovery request in the form of an API request to edge application device management system 140 of computing platform 104, thereby requesting edge application device management system 140 to perform an edge discovery operation for application client 110. In some embodiments, the edge discovery request may include the authorization token obtained from authorization system 150. The authorization token may inform edge application device management system 140 that application client 110 is authorized to request edge application device management system 140 to perform one or more operations including the edge discovery operation. In some embodiments, the edge discovery request may specify a device ID of user device 102 on which application client 110 is implemented. The edge discovery request may also specify the application endpoint ID associated with one or more edge application devices 130 of the application and/or specify the application ID of the application.

At operation 308, in response to the edge discovery request, application client 110 (e.g., edge discovery component 164 of application client 110) may receive from computing platform 104 connection information (e.g., an IP address, a port number, etc.) of a particular edge application device 130 with which application client 110 may communicate. In some embodiments, when receiving the edge discovery request, computing platform 104 may validate the authorization token included in the edge discovery request. If the authorization token is verified as being valid, computing platform 104 may perform an edge discovery operation to identify a particular edge application device 130 for application client 110 among one or more edge application devices 130 of the application that are hosted by computing platform 104.

To identify the particular edge application device 130 for application client 110, edge application device management system 140 of computing platform 104 may identify one or more edge application devices 130 that are associated with the application endpoint ID specified in the edge discovery request. Alternatively, in other embodiments, edge application device management system 140 may identify one or more edge application devices 130 that are associated with the application having the application ID specified in the edge discovery request. In addition to identifying one or more edge application devices 130 of the application, edge application device management system 140 may also determine a geographical location of user device 102 that includes application client 110 of the application. The geographical location of user device 102 may be monitored by a component of computing platform 104 and may be looked up using the device ID of user device 102 specified in the edge discovery request.

In some embodiments, edge application device management system 140 may identify the particular edge application device 130 for application client 110 from one or more edge application devices 130 of the application based at least on the geographical location of user device 102. For example, edge application device management system 140 may identify the particular edge application device 130 that has a shortest distance to user device 102. In some embodiments, the distance between user device 102 and the particular edge application device 130 may be a total distance between the geographical location of user device 102 and the geographical location of each edge computing device associated with the particular edge application device 130. As described herein, the edge computing devices associated with the particular edge application device 130 may be the edge computing devices that implement MEC device 122 on which the particular edge application device 130 is hosted. Due to the shortest distance between user device 102 and the particular edge application device 130, the particular edge application device 130 may respond to requests received from application client 110 of user device 102 with relatively low latency. As a result, performance of application client 110 on user device 102 and/or user experience of the user associated with user device 102 may be improved. Other implementations for identifying a particular edge application device 130 for application client 110 based on the geographical location of user device 102 are also possible and contemplated.

In some embodiments, in addition to the geographical location of user device 102, edge application device management system 140 may identify a particular edge application device 130 for application client 110 based on one or more additional factors. Non-limiting examples of the additional factors include, but are not limited to, an available processing capacity of each edge application device 130 associated with the application, an operation status (e.g., active, downtime, update in progress, etc.) of each edge application device 130 associated with the application, etc. As an example, edge application device management system 140 may identify a subset of edge application devices 130 associated with the application in which each edge application device 130 in the subset has the operation status "active" and/or the available processing capacity sufficient to handle one or more requests from application client 110 of user device 102, and select an edge application device 130 that has the shortest distance between user device 102 and edge application device 130 among the edge application devices 130 in the subset to be a particular edge application device 130 identified for application client 110. Other implementations for identifying a particular edge application device 130 for application client 110 based on the geographical location of user device 102 and one or more additional factors are also possible and contemplated.

At operation 310, application client 110 may establish a connection between application client 110 and the particular edge application device 130 using the connection information (e.g., an IP address, a port number, etc.) of the particular edge application device 130. For example, upon receiving the connection information of the particular edge application device 130 from edge application device management system 140, edge discovery component 164 of application client 110 may provide the connection information of the particular edge application device 130 to application processing component 162 and/or other components of application client 110, and the connection between application client 110 and the particular edge application device 130 may be established by application processing component 162, edge discovery component 164, and/or other components of application client 110 based on the connection information of the particular edge application device 130. Once the connection between application client 110 and the particular edge application device 130 is established, application client 110 may communicate with the particular edge application device 130 via the connection. For example, application processing component 162 of application client 110 may transmit a request associated with a functionality of the application to the particular edge application device 130 via the connection and receive a response to the request from the particular edge application device 130 via the connection.

Figure 4:
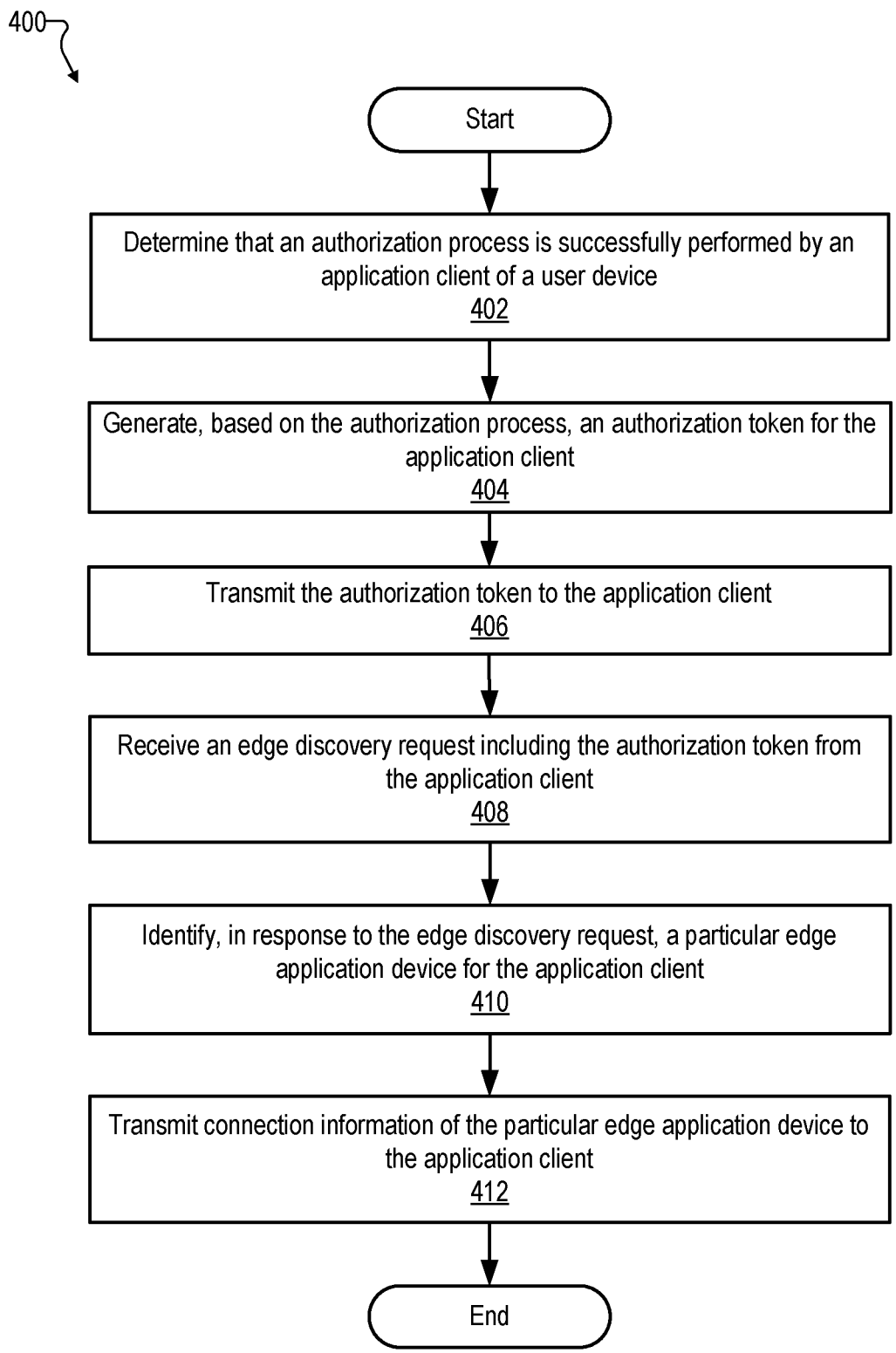
FIG. 4 shows an illustrative method for a computing platform according to embodiments described herein.

FIG. 4 shows an illustrative method 400 for performing edge discovery authorization. Method 400 may be performed from a perspective of computing platform 104. For example, method 400 may be collaboratively performed by authorization system 150, edge application device management system 140, and/or other components of computing platform 104. While FIG. 4 shows illustrative operations according to one embodiment, other embodiments may omit, add to, reorder, and/or modify any of the operations shown in FIG. 4. In some examples, multiple operations shown in FIG. 4 or described in relation to FIG. 4 may be performed concurrently (e.g., in parallel) with one another, rather than being performed sequentially as illustrated and/or described.

At operation 402, computing platform 104 may determine that an authorization process is successfully performed by application client 110 of user device 102. The authorization process may be performed by edge discovery component 164 that is associated with computing platform 104 and integrated into application client 110. As described herein, application client 110 may be associated with an application (e.g., a social network application) and may operate on user device 102. In some embodiments, to perform the authorization process, edge discovery component 164 may cooperate with authorization system 150 of computing platform 104 to perform one or more device authorization operations and one or more application authorization operations. Based on the device authorization operations, authorization system 150 may verify that user device 102 is authorized and up to date. Based on the application authorization operations, authorization system 150 may verify that application client 110 implemented on user device 102 is authentic and that both application client 110 and user device 102 are not compromised. In some embodiments, if authorization system 150 verifies that user device 102 is authorized and up to date, that application client 110 is authentic, and that both application client 110 and user device 102 are not compromised based on the device authorization operations and the application authorization operations, authorization system 150 may determine that the authorization process is successfully performed by edge discovery component 164 of application client 110.

At operation 404, computing platform 104 may generate an authorization token for application client 110 based on the authorization process. For example, in response to determining that the authorization process is successfully performed by edge discovery component 164 of application client 110, authorization system 150 of computing platform 104 may generate the authorization token for application client 110. As described herein, the authorization token may be a cryptographically secured object (e.g., a string object) that can be used as a security credential when application client 110 initiates a request such as an edge discovery request to edge application device management system 140. In some embodiments, the authorization token may expire after a predefined time period and edge discovery component 164 may communicate with authorization system 150 to renew the authorization token when the authorization token expires.

At operation 406, computing platform 104 may transmit the authorization token to application client 110. For example, authorization system 150 of computing platform 104 may transmit the authorization token to edge discovery component 164 of application client 110. Application client 110 may then use the authorization token to initiate an edge discovery request to computing platform 104. For example, edge discovery component 164 of application client 110 may initiate the edge discovery request in the form of an API request to edge application device management system 140 of computing platform 104 using the authorization token as described herein.

At operation 408, computing platform 104 may receive the edge discovery request from application client 110. For example, edge application device management system 140 of computing platform 104 may receive the edge discovery request (e.g., an API request) from edge discovery component 164 of application client 110 requesting edge application device management system 140 to perform an edge discovery operation for application client 110. As described herein, the edge discovery request may include the authorization token obtained from authorization system 150. The authorization token may inform edge application device management system 140 that application client 110 is authorized to request edge application device management system 140 to perform one or more operations including the edge discovery operation. In some embodiments, the edge discovery request may specify a device ID of user device 102 on which application client 110 is implemented. The edge discovery request may also specify the application endpoint ID associated with one or more edge application devices 130 of the application and/or specify the application ID of the application as described herein.

At operation 410, in response to the edge discovery request, computing platform 104 may validate the authorization token included in the edge discovery request and if the authorization token is verified as being valid, computing platform 104 may perform an edge discovery operation to identify a particular edge application device 130 for application client 110 among one or more edge application devices 130 of the application that are hosted by computing platform 104. For example, to identify a particular edge application device 130 for application client 110 based on the edge discovery request, edge application device management system 140 of computing platform 104 may identify one or more edge application devices 130 that are associated with the application endpoint ID specified in the edge discovery request. Alternatively, in other embodiments, edge application device management system 140 may identify one or more edge application devices 130 that are associated with the application having the application ID specified in the edge discovery request. In addition to identifying one or more edge application devices 130 of the application, edge application device management system 140 may also determine a geographical location of user device 102 that includes application client 110 of the application. The geographical location of user device 102 may be monitored by a component of computing platform 104 and may be looked up using the device ID of user device 102 specified in the edge discovery request as described herein.

In some embodiments, edge application device management system 140 may identify a particular edge application device 130 for application client 110 from one or more edge application devices 130 of the application based at least on the geographical location of user device 102. For example, edge application device management system 140 may identify the particular edge application device 130 that has a shortest distance between user device 102 and the particular edge application device 130. As described herein, the distance between user device 102 and the particular edge application device 130 may be the total distance between the geographical location of user device 102 and the geographical location of each edge computing device associated with the particular edge application device 130. The edge computing devices associated with the particular edge application device 130 may be the edge computing devices that implement MEC device 122 on which the particular edge application device 130 is hosted. Due to the shortest distance between user device 102 and the particular edge application device 130, the particular edge application device 130 may respond to requests received from application client 110 of user device 102 with relatively low latency. As a result, performance of application client 110 on user device 102 and/or user experience of the user associated with user device 102 may be improved. Other implementations for identifying a particular edge application device 130 for application client 110 based on the geographical location of user device 102 are also possible and contemplated.

In some embodiments, in addition to the geographical location of user device 102, edge application device management system 140 may identify a particular edge application device 130 for application client 110 based on one or more additional factors as described herein. Non-limiting examples of the additional factors include, but are not limited to, an available processing capacity of each edge application device 130 associated with the application, an operation status (e.g., active, downtime, update in progress, etc.) of each edge application device 130 associated with the application, etc. As an example, edge application device management system 140 may identify a subset of edge application devices 130 associated with the application in which each edge application device 130 in the subset has the operation status "active" and/or the available processing capacity sufficient to handle one or more requests from application client 110 of user device 102, and select an edge application device 130 that has the shortest distance between user device 102 and the edge application device 130 among the edge application devices 130 in the subset to be the particular edge application device 130 identified for application client 110. Other implementations for identifying a particular edge application device 130 for application client 110 based on the geographical location of user device 102 and one or more additional factors are also possible and contemplated.

At operation 412, computing platform 104 may transmit connection information (e.g., an IP address, a port number, etc.) of the particular edge application device 130 identified for application client 110 to application client 110. For example, edge application device management system 140 of computing platform 104 may transmit the connection information of the particular edge application device 130 to edge discovery component 164 of application client 110. When receiving the connection information of the particular edge application device 130 selectively identified for application client 110, application client 110 may establish a connection between application client 110 and the particular edge application device 130 based on the connection information. As an example, edge discovery component 164 of application client 110 may provide the connection information of the particular edge application device 130 to application processing component 162 and/or other components of application client 110, and application processing component 162 and/or other components of application client 110 may establish the connection between application client 110 and the particular edge application device 130 using the connection information of the particular edge application device 130. As another example, edge discovery component 164 may itself establish the connection between application client 110 and the particular edge application device 130 using the connection information of the particular edge application device 130, with or without providing the connection information of the particular edge application device 130 to application processing component 162 and/or to other components of application client 110.

As described herein, when the connection between application client 110 and the particular edge application device 130 is established, application client 110 may communicate with the particular edge application device 130 via the connection. For example, application processing component 162 of application client 110 may transmit a request associated with a functionality of the application to the particular edge application device 130 via the connection and receive a response to the request from the particular edge application device 130 via the connection.

Figure 5A:
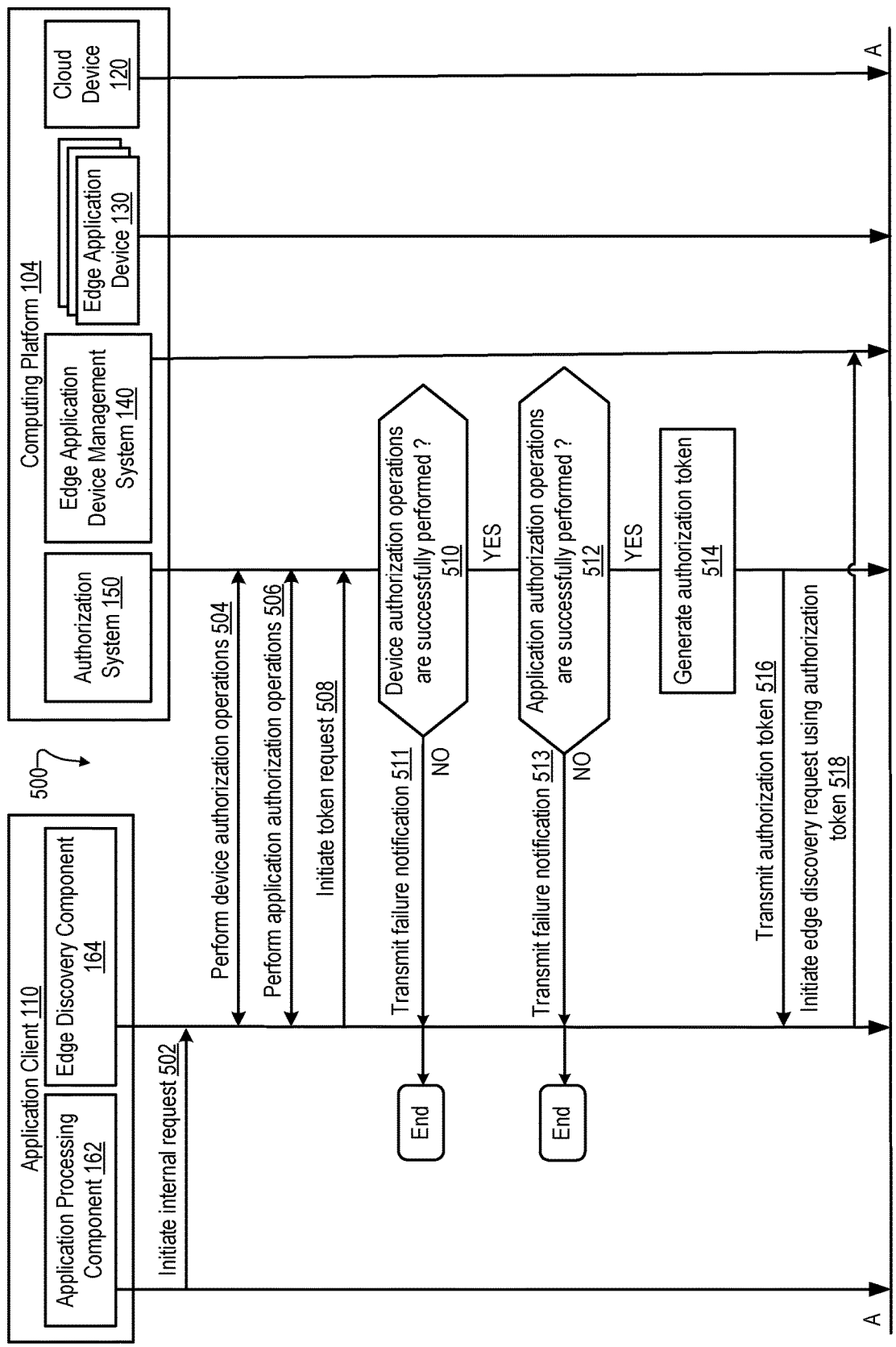
FIGS. 5A and 5B show an illustrative method for a computing system according to embodiments described herein.
Figure 5B:
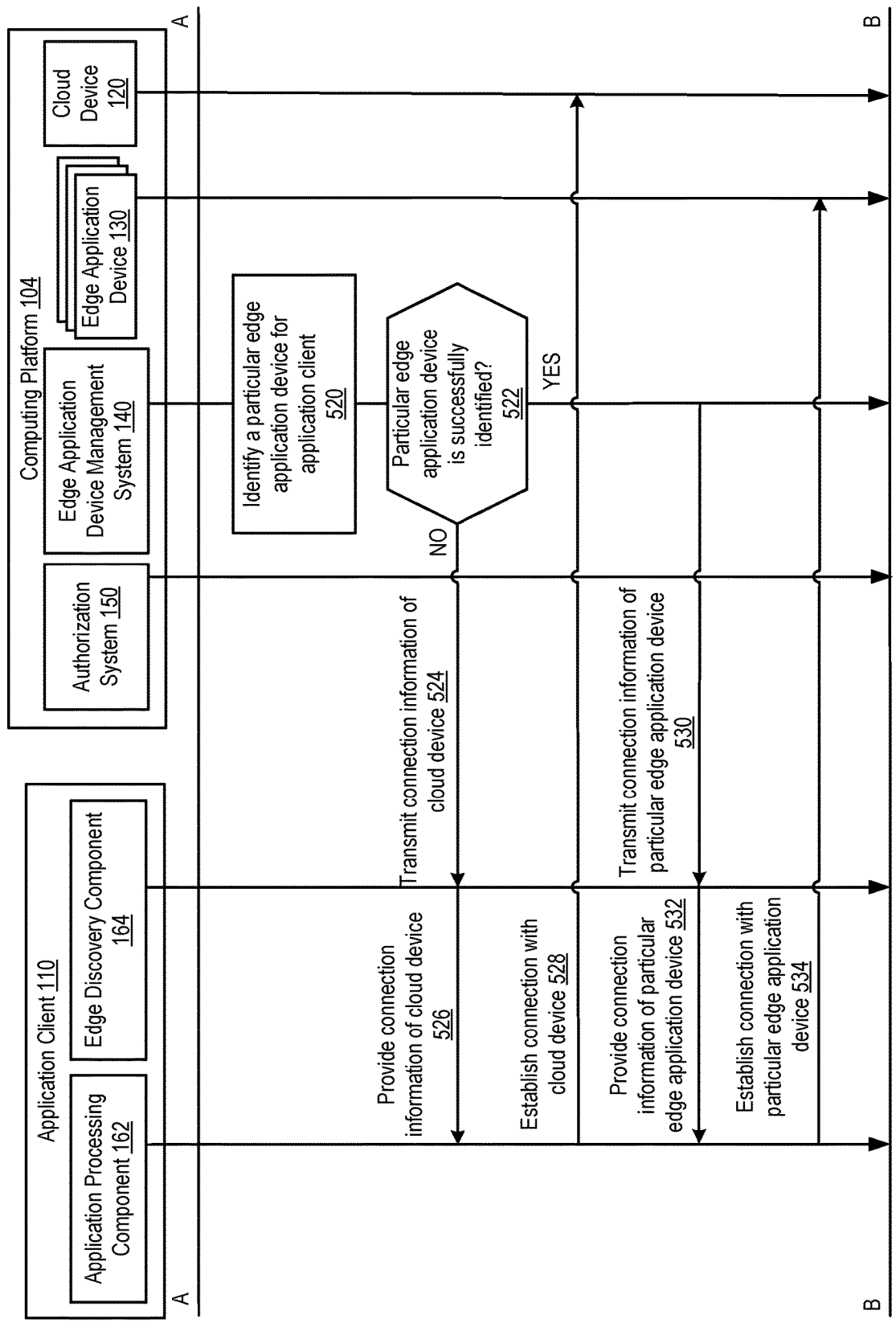

FIGS. 5A and 5B show an illustrative method 500 for performing edge discovery authorization and edge discovery. As depicted in FIGS. 5A and 5B, method 500 may be collaboratively performed by one or more components of application client 110 (e.g., application processing component 162, edge discovery component 164, etc.) and one or more components of computing platform 104 (e.g., authorization system 150, edge application device management system 140, edge application devices 130, cloud devices 120, etc.). While FIGS. 5A and 5B show illustrative operations according to one embodiment, other embodiments may omit, add to, reorder, and/or modify any of the operations shown in FIGS. 5A and 5B. In some examples, multiple operations shown in FIGS. 5A and 5B or described in relation to FIGS. 5A and 5B may be performed concurrently (e.g., in parallel) with one another, rather than being performed sequentially as illustrated and/or described.

At operation 502, application processing component 162 of application client 110 may initiate an internal request within application client 110. As described herein, application client 110 may be associated with an application (e.g., a social network application) and may be implemented on user device 102. As depicted in FIG. 5A, application processing component 162 may initiate the internal request to edge discovery component 164. Edge discovery component 164 may be associated with computing platform 104 and may be integrated into application client 110 as described herein.

In some embodiments, application processing component 162 may initiate the internal request when application client 110 needs to communicate with an edge application device 130 of the application. For example, application client 110 may need to request a server instance of the application to perform a functionality of the application, and therefore application client 110 may need an edge discovery operation to be performed to identify a particular edge application device 130 of the application with which application client 110 may communicate. Accordingly, application processing component 162 of application client 110 may initiate the internal request to edge discovery component 164 integrated into application client 110. The internal request may trigger the edge discovery authorization to be performed for application client 110 so that application client 110 may be authorized to initiate an edge discovery request to computing platform 104. In some embodiments, the internal request may specify the application endpoint ID associated with one or more edge application devices 130 of the application hosted by computing platform 104. Additionally or alternatively, the internal request may specify an application ID of the application and the application ID may be used to identify one or more edge application devices 130 of the application as described herein.

In some embodiments, in response to the internal request, edge discovery component 164 of application client 110 may cooperate with authorization system 150 of computing platform 104 to perform the edge discovery authorization for application client 110. To perform the edge discovery authorization for application client 110, edge discovery component 164 may communicate with authorization system 150 to perform an authorization process with computing platform 104. The authorization process may include one or more device authorization operations and one or more application authorization operations being performed.

At operation 504, edge discovery component 164 may interact with authorization system 150 to perform one or more device authorization operations. To perform the device authorization operations, edge discovery component 164 may transmit device information specific to user device 102 such as a device ID of user device 102 to authorization system 150. In some embodiments, authorization system 150 may use the device information (e.g., the device ID) of user device 102 to look up user device 102 in a user device database of computing platform 104. If the user device database includes a database entry associated with user device 102, authorization system 150 may determine that user device 102 is enrolled and/or registered with computing platform 104. On the other hand, if the user device database does not include a database entry associated with user device 102, authorization system 150 may determine that user device 102 is not enrolled and/or registered with computing platform 104. If user device 102 is not enrolled and/or registered with computing platform 104, application client 110 on user device 102 may not be able to communicate with edge application devices 130 within computing platform 104 and may not be authorized to request the edge discovery operation to be performed. In this case, authorization system 150 may determine that user device 102 is unauthorized and/or illegitimate.

In some embodiments, to perform the device authorization operations, authorization system 150 may also determine whether user device 102 is compatible with computing platform 104. To determine whether user device 102 is compatible with computing platform 104, authorization system 150 may obtain a compatibility status of user device 102, for example, from the database entry associated with user device 102 in the user device database. In some embodiments, if the compatibility status of user device 102 indicates that user device 102 includes one or more components for performing one or more functionalities associated with computing platform 104 and these components are up to date, authorization system 150 may determine that user device 102 is compatible with computing platform 104. Otherwise, authorization system 150 may determine that user device 102 is incompatible with computing platform 104. As an example, the compatibility status of user device 102 may indicate that user device 102 includes edge discovery component 164 integrated into application client 110 in which edge discovery component 164 is configured to perform edge discovery authorization with computing platform 104. The compatibility status of user device 102 may also indicate that edge discovery component 164 is updated to a latest version. In this case, authorization system 150 may determine that user device 102 is compatible with computing platform 104.

In some embodiments, if authorization system 150 determines that user device 102 is enrolled and/or registered with computing platform 104 and that user device 102 is compatible with computing platform 104, authorization system 150 may determine that user device 102 is authorized and is up to date. Authorization system 150 may then generate a device approval object indicating that user device 102 is authorized and is up to date and transmit the device approval object to edge discovery component 164. On the other hand, if authorization system 150 determines that user device 102 is not enrolled and/or registered with computing platform 104 and/or that user device 102 is incompatible with computing platform 104, authorization system 150 may determine that user device 102 is unauthorized and/or is not up to date. Authorization system 150 may then generate a failure notification indicating that user device 102 is unauthorized and/or is not up to date, and transmit the failure notification to edge discovery component 164.

At operation 506, edge discovery component 164 may interact with authorization system 150 to perform one or more application authorization operations. To perform the application authorization operations, edge discovery component 164 may transmit an authorization assertion (e.g., a software statement) associated with application client 110 to authorization system 150. Computing platform 104 may provide the authorization assertion to application client 110 (e.g., during the enrollment and/or registration of user device 102 including application client 110 with computing platform 104) and the authorization assertion may allow application client 110 to communicate with edge application devices 130 of the application within computing platform 104. In some embodiments, in addition to the authorization assertion associated with application client 110, edge discovery component 164 may also transmit an attestation object corresponding to the authorization assertion to authorization system 150. The attestation object may be computed by an operating system of user device 102 from the authorization assertion associated with application client 110 and may be used to verify that user device 102 and application client 110 are not compromised.

In some embodiments, when receiving the authorization assertion associated with application client 110 and the attestation object corresponding to the authorization assertion from edge discovery component 164, authorization system 150 may validate the authorization assertion and the attestation object corresponding to the authorization assertion. For example, authorization system 150 may determine whether the authorization assertion and the attestation object received from edge discovery component 164 match the corresponding authorization assertion and the corresponding attestation object maintained by authorization system 150. If the authorization assertion and the attestation object received from edge discovery component 164 match the corresponding authorization assertion and the corresponding attestation object maintained by authorization system 150, authorization system 150 may determine that the authorization assertion and the attestation object received from edge discovery component 164 are valid, and therefore determine that application client 110 on user device 102 is authentic and that application client 110 and user device 102 are not compromised. In this case, authorization system 150 may generate an application approval object indicating that application client 110 is authentic and that application client 110 and user device 102 are not compromised, and transmit the application approval object to edge discovery component 164.

On the other hand, if the authorization assertion received from edge discovery component 164 does not match the corresponding authorization assertion maintained by authorization system 150 and/or the attestation object received from edge discovery component 164 does not match the corresponding attestation object maintained by authorization system 150, authorization system 150 may determine that the authorization assertion and/or the attestation object received from edge discovery component 164 are invalid, and therefore determine that application client 110 on user device 102 is not authentic or at least one of application client 110 or user device 102 is compromised. In this case, authorization system 150 may generate a failure notification indicating that application client 110 is not authentic and/or at least one of application client 110 or user device 102 is compromised, and transmit the failure notification to edge discovery component 164.

It should be understood that one or more device authorization operations and/or one or more application authorization operations described herein may be performed by a separate system such as a third-party system. For example, authorization system 150 may transmit the authorization assertion associated with application client 110 and/or the attestation object corresponding to the authorization assertion to the third-party system. The third-party system may validate the authorization assertion and/or the attestation object and provide a validation output to authorization system 150. Authorization system 150 may then generate one or more approval objects and/or one or more failure notifications based on the validation output as described above.

At operation 508, edge discovery component 164 may initiate a token request to authorization system 150 requesting authorization system 150 to generate an authorization token for application client 110. In some embodiments, the token request may include the device ID of user device 102 on which application client 110 is implemented, the device approval object received from authorization system 150, and the application approval object received from authorization system 150. As described herein, the device approval object may be generated based on the device authorization operations and may indicate that user device 102 is authorized and up to date. The application approval object may be generated based on the application authorization operations and may indicate that application client 110 is authentic and that application client 110 and user device 102 are not compromised.

At operation 510, when receiving the token request from edge discovery component 164, authorization system 150 may determine whether the device authorization operations are successfully performed by edge discovery component 164. In some embodiments, authorization system 150 may validate the device approval object included in the token request. For example, if authorization system 150 verifies that the device approval object included in the token request is generated by authorization system 150 and has not been expired, authorization system 150 may determine that the device approval object is valid, and therefore determine that the device authorization operations are successfully performed by edge discovery component 164. Accordingly, authorization system 150 may determine that user device 102 is authorized and up to date as indicated by the device approval object generated based on the device authorization operations. Otherwise, authorization system 150 may determine that the device approval object is invalid, and therefore determine that the device authorization operations are not successfully performed by edge discovery component 164.

In some embodiments, instead of or in addition to validating the device approval object, authorization system 150 may transmit the device approval object to a separate system such as a third-party system. The third-party system may validate the device approval object and provide a validation output to authorization system 150. Authorization system 150 may then determine whether the device authorization operations are successfully performed by edge discovery component 164 based on the validation output as described above.

In some embodiments, if at operation 510, authorization system 150 determines that the device authorization operations are not successfully performed by edge discovery component 164, authorization system 150 may generate a failure notification indicating that an authorization token is not granted to application client 110 due to a device authorization failure. At operation 511, authorization system 150 may transmit the failure notification to edge discovery component 164 and method 500 may end.

In some embodiments, if at operation 510, authorization system 150 determines that the device authorization operations are successfully performed by edge discovery component 164, at operation 512, authorization system 150 may determine whether the application authorization operations are successfully performed by edge discovery component 164. In some embodiments, authorization system 150 may validate the application approval object included in the token request. For example, if authorization system 150 verifies that the application approval object included in the token request is generated by authorization system 150 and has not been expired, authorization system 150 may determine that the application approval object is valid, and therefore determine that the application authorization operations are successfully performed by edge discovery component 164. Accordingly, authorization system 150 may determine that application client 110 is authentic and that application client 110 and user device 102 are not compromised as indicated by the application approval object generated based on the application authorization operations. Otherwise, authorization system 150 may determine that the application approval object is invalid, and therefore determine that the application authorization operations are not successfully performed by edge discovery component 164.

In some embodiments, instead of or in addition to validating the application approval object, authorization system 150 may transmit the application approval object to a separate system such as a third-party system. The third-party system may validate the application approval object and provide a validation output to authorization system 150. Authorization system 150 may then determine whether the application authorization operations are successfully performed by edge discovery component 164 based on the validation output as described above.

In some embodiments, if at operation 512, authorization system 150 determines that the application authorization operations are not successfully performed by edge discovery component 164, authorization system 150 may generate a failure notification indicating that an authorization token is not granted to application client 110 due to an application authorization failure. At operation 513, authorization system 150 may transmit the failure notification to edge discovery component 164 and method 500 may end.

In some embodiments, if at operation 512, authorization system 150 determines that the application authorization operations are successfully performed by edge discovery component 164, at operation 514, authorization system 150 may generate an authorization token for application client 110. Thus, authorization system 150 may generate the authorization token for application client 110 when both the device authorization operations and the application authorization operations are successfully performed as depicted in FIG. 5A. Accordingly, the authorization token may be granted to application client 110 if application client 110 is authentic, user device 102 including application client 110 is authorized and up to date, and application client 110 and user device 102 are not compromised. In some embodiments, when the authorization token is granted to application client 110, application client 110 may be able to request edge application device management system 140 of computing platform 104 to perform one or more operations such as an edge discovery operation for application client 110. The authorization token may be used as a security credential when application client 110 initiates a request such as an edge discovery request to edge application device management system 140. In some embodiments, the authorization token may be a cryptographically secured object (e.g., a string object) and may expire after a predefined time period. When the authorization token expires, edge discovery component 164 may communicate with authorization system 150 to renew the authorization token.

At operation 516, authorization system 150 may transmit the authorization token generated for application client 110 to edge discovery component 164.

At operation 518, edge discovery component 164 may initiate an edge discovery request to edge application device management system 140 of computing platform 104 using the authorization token. For example, edge discovery component 164 may initiate the edge discovery request in the form of an API request to edge application device management system 140, thereby requesting edge application device management system 140 to perform an edge discovery operation for application client 110. In some embodiments, the edge discovery request may include the authorization token that edge discovery component 164 receives from authorization system 150. The authorization token may inform edge application device management system 140 and/or other components of computing platform 104 that application client 110 is authorized to request edge application device management system 140 to perform the edge discovery operation. In some embodiments, the edge discovery request may specify the device ID of user device 102 on which application client 110 is implemented. The edge discovery request may also specify the application endpoint ID associated with one or more edge application devices 130 of the application and/or specify the application ID of the application.

At operation 520 (shown in FIG. 5B), in response to the edge discovery request, edge application device management system 140 may identify a particular edge application device 130 for application client 110 among one or more edge application devices 130 of the application hosted by computing platform 104. Before identifying the particular edge application device 130 for application client 110, edge application device management system 140 may communicate with authorization system 150 to validate the authorization token included in the edge discovery request. For example, authorization system 150 may verify that the authorization token is generated by authorization system 150 and has not been expired. Authorization system 150 may also reference an authorization scope of the authorization token granted to application client 110 and verify that application client 110 is authorized to request edge application device management system 140 to perform an edge discovery operation for application client 110.

In some embodiments, once the authorization token is verified as being valid, edge application device management system 140 may perform an edge discovery operation to identify a particular edge application device 130 for application client 110. To identify the particular edge application device 130 for application client 110, edge application device management system 140 may identify one or more edge application devices 130 within computing platform 104 that are associated with the application endpoint ID specified in the edge discovery request. Alternatively, in other embodiments, edge application device management system 140 may identify one or more edge application devices 130 within computing platform 104 that are associated with the application having the application ID specified in the edge discovery request. In addition to identifying one or more edge application devices 130 of the application, edge application device management system 140 may also determine a geographical location of user device 102 that includes application client 110 of the application. The geographical location of user device 102 may be monitored by a component of computing platform 104 and may be looked up using the device ID of user device 102 specified in the edge discovery request as described herein.

In some embodiments, edge application device management system 140 may identify a particular edge application device 130 for application client 110 based at least on the geographical location of user device 102. In some embodiments, for each edge application device 130 of the application, edge application device management system 140 may compute a distance between user device 102 and edge application device 130. The distance between user device 102 and edge application device 130 may be a total distance between the geographical location of user device 102 and a geographical location of each edge computing device associated with edge application device 130. As described herein, the edge computing devices associated with edge application device 130 may be the edge computing devices that implement MEC device 122 on which edge application device 130 is hosted.

In some embodiments, edge application device management system 140 may identify the edge application device 130 that has the shortest distance between user device 102 and edge application device 130, and select that edge application device 130 to be the particular edge application device 130 identified for application client 110. Alternatively, in other embodiments, edge application device management system 140 may identify a subset of edge application devices 130 in which each edge application device 130 in the subset of edge application devices 130 has the distance between user device 102 and edge application device 130 satisfying a predefined distance threshold (e.g., distance between user device 102 and edge application device 130 is shorter than the predefined distance threshold). Edge application device management system 140 may then select (e.g., randomly or based on one or more criteria) an edge application device 130 from the subset of edge application devices 130 to be the particular edge application device 130 identified for application client 110. Other implementations for identifying the particular edge application device 130 for application client 110 based on the geographical location of user device 102 are also possible and contemplated.

In some embodiments, in addition to the geographical location of user device 102, edge application device management system 140 may also identify the particular edge application device 130 for application client 110 based on one or more additional factors. Non-limiting examples of the additional factors include, but are not limited to, an available processing capacity of each edge application device 130 associated with the application, an operation status (e.g., active, downtime, update in progress, etc.) of each edge application device 130 associated with the application, etc.

As an example, edge application device management system 140 may identify a subset of edge application devices 130 associated with the application in which each edge application device 130 in the subset has the operation status "active" and/or the available processing capacity sufficient to handle one or more requests from application client 110 of user device 102, and select an edge application device 130 that has the shortest distance between user device 102 and edge application device 130 among the edge application devices 130 in the subset to be the particular edge application device 130 identified for application client 110. As another example, edge application device management system 140 may identify a subset of edge application devices 130 associated with the application in which each edge application device 130 in the subset has the distance between user device 102 and edge application device 130 satisfying the predefined distance threshold (e.g., the distance between user device 102 and edge application device 130 is shorter than the predefined distance threshold) and also has the operation status "active" and/or the available processing capacity sufficient to handle one or more requests from application client 110 of user device 102. Edge application device management system 140 may then randomly select an edge application device 130 from the subset to be the particular edge application device 130 identified for application client 110. Other implementations for identifying the particular edge application device 130 for application client 110 based on the geographical location of user device 102 and one or more additional factors are also possible and contemplated.

In some embodiments, edge application device management system 140 may not always be able to successfully identify a particular edge application device 130 for application client 110 among one or more edge application devices 130 of the application hosted by computing platform 104. As an example, due to the geographical location of user device 102, there may be no edge application device 130 of the application that has the distance between user device 102 and edge application device 130 satisfying the predefined distance threshold (e.g., the distance between user device 102 and any edge application device 130 of the application is longer than the predefined distance threshold). As another example, among edge application devices 130 that have the distance between user device 102 and edge application device 130 satisfying the predefined distance threshold, there may be no edge application device 130 that has the available processing capacity sufficient to handle one or more requests from application client 110 of user device 102. In these situations, edge application device management system 140 may determine that a particular edge application device 130 for application client 110 is not successfully identified.

At operation 522, edge application device management system 140 may determine whether a particular edge application device 130 for application client 110 is successfully identified. If at operation 522, edge application device management system 140 determines that a particular edge application device 130 for application client 110 is not successfully identified, edge application device management system 140 may identify a cloud device 120 on which a server instance of the application is hosted. As described herein, cloud device 120 may be implemented with one or more physical computing devices geographically located at a relatively long distance from user device 102. For example, cloud device 120 may be a hardware server or a virtual server implemented by or on physical computing devices located within a remote data center. At operation 524, edge application device management system 140 may transmit connection information (e.g., an IP address, a port number) of the server instance associated with the application and hosted by cloud device 120 to edge discovery component 164.

At operation 526, edge discovery component 164 may provide the connection information of the server instance implemented on cloud device 120 to application processing component 162 of application client 110. At operation 528, application processing component 162 may establish a connection between application client 110 and the server instance based on the connection information of the server instance. Alternatively, the connection between application client 110 and the server instance may be established by edge discovery component 164 and/or other components of application client 110 based on the connection information of the server instance. Once the connection between application client 110 and the server instance is established, application client 110 of the application may communicate with the server instance via the connection. For example, application processing component 162 of application client 110 may transmit a request associated with a functionality of the application to the server instance on via the connection and receive a response to the request from the server instance via the connection. Thus, in this case, application client 110 implemented on user device 102 may communicate with the server instance implemented on cloud device 120 in which physical computing devices implementing cloud device 120 may be located remotely from user device 102.

In some embodiments, instead of identifying a cloud device 120 on which a server instance of the application is hosted and transmitting connection information of the server instance to edge discovery component 164 as described above, edge application device management system 140 may transmit to edge discovery component 164 a failure notification indicating that a particular edge application device 130 for application client 110 is unsuccessfully identified. When receiving the failure notification, application client 110 (e.g., edge discovery component 164, application processing component 162, and/or other components of application client 110) may communicate directly with a cloud device 120 and request connection information of a server instance associated with the application from the cloud device 120.

In some embodiments, if the cloud device 120 implements a server instance of the application, cloud device 120 may transmit connection information (e.g., an IP address, a port number, etc.) of the server instance to application client 110, and application client 110 (e.g., edge discovery component 164, application processing component 162, and/or other components of application client 110) may establish a connection between application client 110 and the server instance based on the connection information of the server instance. In some embodiments, if the cloud device 120 does not implement a server instance of the application, cloud device 120 may redirect the request of application client 110 to a different cloud device 120 (e.g., to a cloud device 120 on which a server instance of the application is hosted).

On the other hand, if at operation 522, edge application device management system 140 determines that a particular edge application device 130 for application client 110 is successfully identified, at operation 530, edge application device management system 140 may transmit connection information (e.g., an IP address, a port number) of the particular edge application device 130 identified for application client 110 to edge discovery component 164.

At operation 532, edge discovery component 164 may provide the connection information of the particular edge application device 130 to application processing component 162 of application client 110. At operation 534, application processing component 162 may establish a connection between application client 110 and the particular edge application device 130 based on the connection information of the particular edge application device 130. Alternatively, the connection between application client 110 and the particular edge application device 130 may be established by edge discovery component 164 and/or other components of application client 110 based on the connection information of the particular edge application device 130. Once the connection between application client 110 and the particular edge application device 130 is established, application client 110 of the application may communicate with the particular edge application device 130 of the application via the connection. For example, application processing component 162 of application client 110 may transmit a request associated with a functionality of the application to the particular edge application device 130 via the connection and receive a response to the request from the particular edge application device 130 via the connection. Thus, in this case, application client 110 implemented on user device 102 may communicate with the particular edge application device 130 hosted on MEC device 122 in which physical computing devices implementing MEC device 122 may be located proximate to user device 102. As a result, the particular edge application device 130 may respond to requests received from application client 110 of user device 102 with relatively low latency. Accordingly, performance of application client 110 on user device 102 and/or user experience of the user associated with user device 102 may be improved.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
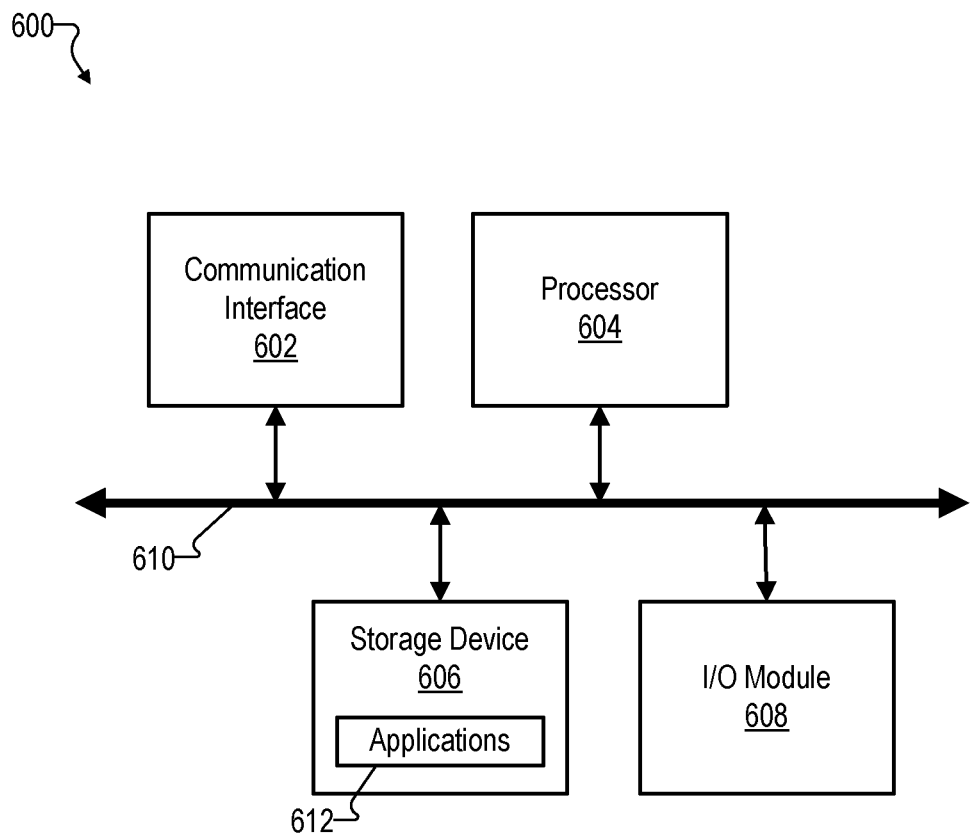
FIG. 6 shows an illustrative computing device according to embodiments described herein.

FIG. 6 shows an illustrative computing device 600 that may be specifically configured to perform one or more of the processes described herein. For example, computing device 600 may include or implement (or partially implement) a component within a computing system (e.g., systems 100, 200) such as user device 102, computing platform 104, cloud device 120, MEC device 122, edge application device 130, edge application device management system 140, authorization system 150, and/or any other computing devices described herein. Computing device 600 may also include or implement (or partially implement) a component of the component within the computing system such as application processing component 162, edge discovery component 164, and/or any other modules described herein.

As shown in FIG. 6, computing device 600 may include a communication interface 602, a processor 604, a storage device 606, and an input/output ("I/O") module 608 communicatively connected via a communication infrastructure 610. While an illustrative computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities and/or operations described herein may be implemented by or within one or more components of computing device 600. For example, one or more applications 612 residing within storage device 606 may be configured to direct processor 604 to perform one or more processes or functions associated with components of computing systems 100 and/or 200. Likewise, memory of the components within these computing systems may be implemented by or within storage device 606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by an application client on a user device, an internal request from within the application client, the internal request associated with one or more edge application devices hosted by a computing platform;
   obtaining, by the application client and in response to the internal request, an authorization token from the computing platform;
   initiating, by the application client, an edge discovery request to the computing platform using the authorization token;
   receiving, by the application client and in response to the edge discovery request, connection information of a particular edge application device among the one or more edge application devices that is identified for the application client by the computing platform; and
   establishing, by the application client, a connection between the application client and the particular edge application device using the connection information of the particular edge application device.

2. The method of claim 1, wherein:
   the application client on the user device is associated with an application; and
   each edge application device among the one or more edge application devices is a server instance associated with the application and implemented on a multi-access edge computing (MEC) device.

3. The method of claim 2, wherein:
   the MEC device is implemented with one or more edge computing devices of the computing platform that are geographically located proximate to one or more user devices.

4. The method of claim 1, wherein:
   the computing platform is configured to identify the particular edge application device for the application client from the one or more edge application devices based at least on a geographical location of the user device.

5. The method of claim 1, wherein:
   the internal request specifies an application endpoint identifier associated with the one or more edge application devices.

6. The method of claim 1, wherein the obtaining of the authorization token from the computing platform includes:
performing, by the application client, an authorization process with the computing platform; and
receiving, by the application client, the authorization token generated based on the authorization process from the computing platform.

7. The method of claim 6, wherein the performing of the authorization process with the computing platform includes:
performing one or more device authorization operations to verify that the user device is authorized and up to date; and
performing one or more application authorization operations to verify that the application client is authentic and that the application client and the user device are not compromised.

8. The method of claim 1, wherein:
the edge discovery request is an application programming interface (API) request; and
the edge discovery request includes the authorization token and specifies one or more of a device identifier of the user device or an application endpoint identifier associated with the one or more edge application devices.

9. A method comprising:
determining, by a computing platform, that an authorization process is successfully performed by an application client of a user device, the application client being associated with an application;
generating, by the computing platform and based on the authorization process, an authorization token for the application client;
transmitting, by the computing platform, the authorization token to the application client;
receiving, by the computing platform, an edge discovery request including the authorization token from the application client;
identifying, by the computing platform and in response to the edge discovery request, a particular edge application device for the application client among one or more edge application devices of the application that are hosted by the computing platform; and
transmitting, by the computing platform, connection information of the particular edge application device to the application client.

10. The method of claim 9, wherein:
the application client is configured to establish a connection between the application client and the particular edge application device based on the connection information.

11. The method of claim 9, wherein:
each edge application device among the one or more edge application devices is a server instance associated with the application and implemented on a multi-access edge computing (MEC) device.

12. The method of claim 11, wherein:
the MEC device is implemented with one or more edge computing devices of the computing platform that are geographically located proximate to one or more user devices.

13. The method of claim 9, wherein the identifying of the particular edge application device for the application client includes:
identifying the particular edge application device for the application client from the one or more edge application devices based at least on a geographical location of the user device.

14. The method of claim 9, wherein the determining that the authorization process is successfully performed by the application client includes:
verifying, based on one or more device authorization operations performed by the application client, that the user device is authorized and up to date; and
verifying, based on one or more application authorization operations performed by the application client, that the application client is authentic and that the application client and the user device are not compromised.

15. The method of claim 9, wherein:
the edge discovery request is an application programming interface (API) request; and
the edge discovery request specifies one or more of a device identifier of the user device or an application endpoint identifier associated with the one or more edge application devices.

16. A system comprising:
a memory storing instructions; and
a processor communicatively coupled to the memory and configured to execute the instructions to:
receive, by an application client on a user device, an internal request from within the application client, the internal request associated with one or more edge application devices hosted by a computing platform;
obtain, by the application client and in response to the internal request, an authorization token from the computing platform;
initiate, by the application client, an edge discovery request to the computing platform using the authorization token;
receive, by the application client and in response to the edge discovery request, connection information of a particular edge application device among the one or more edge application devices that is identified for the application client by the computing platform; and
establish, by the application client, a connection between the application client and the particular edge application device using the connection information of the particular edge application device.

17. The system of claim 16, wherein:
the application client on the user device is associated with an application; and
each edge application device among the one or more edge application devices is a server instance associated with the application and implemented on a multi-access edge computing (MEC) device.

18. The system of claim 17, wherein:
the MEC device is implemented with one or more edge computing devices of the computing platform that are geographically located proximate to one or more user devices.

19. The system of claim 16, wherein:
the computing platform is configured to identify the particular edge application device for the application client from the one or more edge application devices based at least on a geographical location of the user device.

20. The system of claim 16, wherein the obtaining of the authorization token from the computing platform includes:
performing, by the application client, an authorization process with the computing platform; and
receiving, by the application client, the authorization token generated based on the authorization process from the computing platform.

* * * * *